J. BENTON.
DIE AND PROCESS FOR MAKING CUP HANDLES.
APPLICATION FILED AUG. 24, 1920.

1,394,465.   Patented Oct. 18, 1921.
2 SHEETS—SHEET 1.

James Benton,
INVENTOR

BY Victor J. Evans
ATTORNEY

J. BENTON.
DIE AND PROCESS FOR MAKING CUP HANDLES.
APPLICATION FILED AUG. 24, 1920.

1,394,465.       Patented Oct. 18, 1921.
2 SHEETS—SHEET 2.

James Benton,
INVENTOR

BY Victor J. Evans
ATTORNEY

UNITED STATES PATENT OFFICE.

JAMES BENTON, OF EAST PALESTINE, OHIO.

DIE AND PROCESS FOR MAKING CUP-HANDLES.

1,394,465. Specification of Letters Patent. Patented Oct. 18, 1921.

Application filed August 24, 1920. Serial No. 405,670.

*To all whom it may concern:*

Be it known that I, JAMES BENTON, a citizen of the United States, residing at East Palestine, in the county of Columbiana and State of Ohio, have invented new and useful Improvements in Die and Processes for Making Cup-Handles, of which the following is a specification.

This invention relates to the making of articles of pottery, and more particularly to a die and a method for making cup handles.

One of the main objects of the invention is to provide simple and practical means whereby cup handles and similar articles of pottery may be readily manufactured in large number by machine operated dies, instead of being cast by hand as is the common practice. A further object is to provide a die by means of which a plurality of articles may be formed at a single operation and may be quickly and easily removed from the die. Further objects will appear from the detailed description.

In the drawings:
Figure 1 is a side view of the die and associated parts showing the upper section raised.

Figure 1:
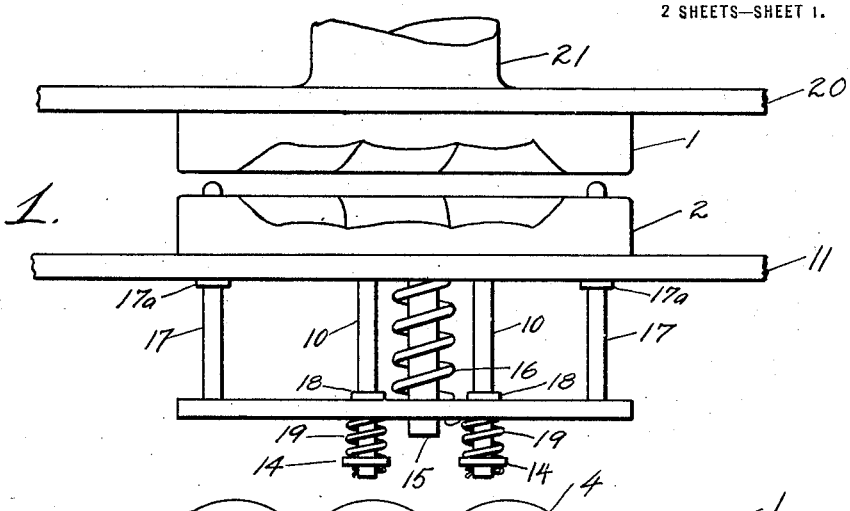
Figure 2:
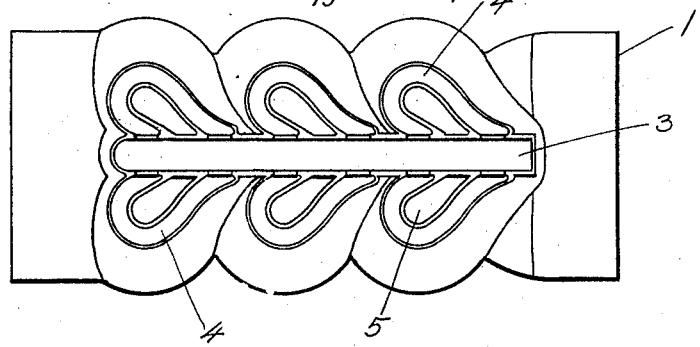
Fig. 2 is an underneath view of the upper die section.
Figure 3:
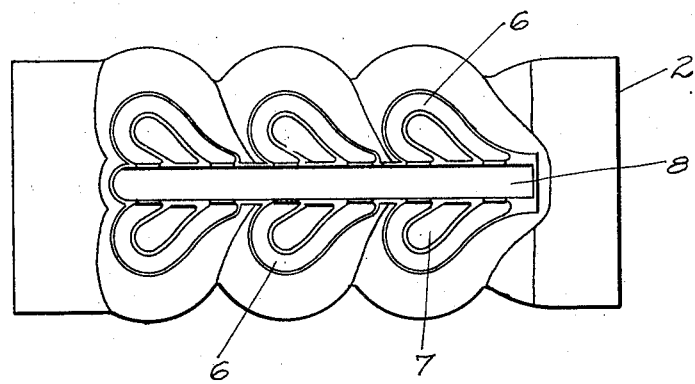
Fig. 3 is a top plan view of the lower die section.

It is the present practice in large potter-ies to form cup handles by casting by pouring a suitable mixture or "slip" into a plaster of Paris mold and permitting this slip to set. This necessarily requires considerable time and space and is a very slow method, and to supply the demand it is necessary to employ a considerable force in the making of cup handles and similar articles. In addition, this method necessitates the use of a great number of molds and requires considerable space for the operators. By my method the number of cup handles required by a large pottery can be readily produced by a single machine in a day, and this machine can be run by a single operator thus effecting a great saving in pay, in addition to the enormous saving in space and material at present utilized in making the plaster molds employed by the present process.

In carrying my invention into effect I provide a die composed of an upper section 1 and a lower section 2. The upper section is provided with a central longitudinally extending groove 3 with which communicate a plurality of recesses or grooves 4 corresponding in shape to a cup handle, the space inclosed by each of these grooves being open to provide an opening 5 to permit escape of the clay during the pressing operation. The lower section 2 is provided in its upper face with a series of grooves 6 corresponding to grooves 4 and extending about openings 7. As will be understood, the two sections are substantial counter parts of each other and when forced together serve to mold or press out from a suitable bat or "pug" of clay a plurality of, in this case 6, cup handles.

Figure 4:
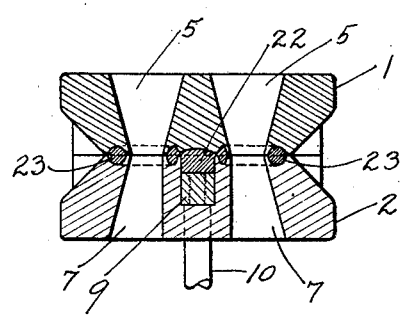
Fig. 4 is a transverse section of the die in closed or operative condition.
Figure 5:
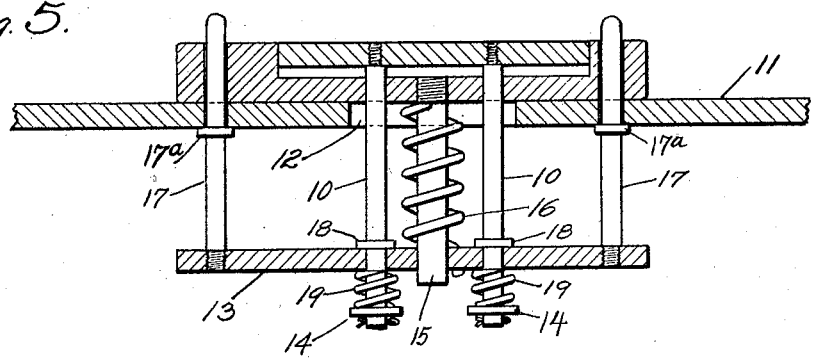
Fig. 5 is a central longitudinal section through the lower die section and associated parts, partly in elevation.
Figure 6:
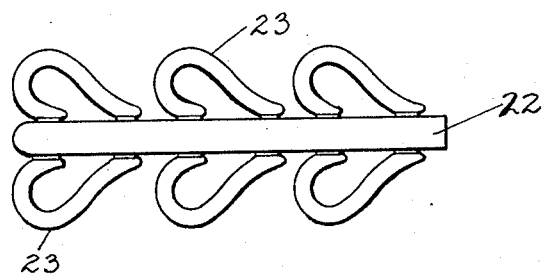
Fig. 6 is a plan view of a set of handles attached to a stick.

As will be noted more clearly from Figs. 4 and 5, lower section 2 is provided with a relatively deep groove 8 corresponding to groove 3 of section 1. This groove is of substantially rectangular cross section and receives a plunger head 9 which fits snugly within the groove and extends the full length thereof. Two pins 10 are secured in head 9 equidistant from the center thereof and are slidable through openings extending through the lower portion of section 2 for this purpose. In practice the lower portion 2 is mounted on plate 11 of a press of suitable type and the pins 10 extend through the usual central opening 12 in this plate. These pins also extend through a plate 13 positioned below plate 11 and receive nuts 14 threaded on their lower ends below plate
13. A stud 15 is secured in the under face of section 2 and extends through an opening in plate 13. This stud receives a tension spring 16 mounted about the same, the upper end of this spring being secured through the stud and the lower end of the spring being secured to plate 13. Plate 13 is provided adjacent to each end with pin 17 secured thereto, this pin extending through registering openings provided in section 2 and in plate 11. As will be noted from Fig. 5, the pins 17 are of such length as to project above the upper face of die section 2 when the die is open, spring 16 serving to normally hold plate 13 in raised position. Each of the pins 10 is provided adjacent to its lower end with an annular shoulder 18 which is in contact with the upper face of plate 13 so that the spring 16 acts to normally hold plunger head 9 raised slightly above the upper face of section 2. Preferably, though not necessarily, an expansion spring 19 is mounted about each of the pins 10 between nut 14 and plate 13.

In practice, lower section 2 of the die is secured to plate 11 of a suitable press, the upper section being secured to a head 20 which is secured on the lower end of shaft 21 which is reciprocated vertically in any well known or suitable manner, the travel of this shaft being so adjusted that, when in its lowermost position, the upper section of the die is pressed into contact with the lower section for pressing the articles from a suitable bat of clay resting upon the upper face of the lower die section. In using the die, when the upper section is raised the upper face of plunger head 9 is flush with the upper face of lower section 2, as in Fig. 5. For this purpose each of the pins 17 may be provided with an annular shoulder 17ª which contacts with the under face of table 11 to positively limit upward movement of plate 13, or upward movement of this plate may be limited in any other suitable manner. After upper section 1 of the die is raised, a suitable bat or pug of clay is placed upon the upper face of lower section 2. When the upper section descends it first strikes the upper ends of pins 17 thus depressing plate 13 and moving head 9 into its lowermost position within groove 8. As the upper section moves into its lowermost position, the clay is pressed to provide a central member or stick 22 and six handles 23 which are attached to the sides of this stick, three at each side, the grooves for these handles in the die sections being provided at each end with a raised end wall or element so as to materially reduce in thickness the material by which the handles are attached to the stick so as to permit ready detachment thereof. As the upper die section is raised, head 9 is raised thus raising the stick 22 and attached handles 23. This raises the stick above the body of lower section 2 so as to permit it to be readily gripped at each end and removed from the die, a second "pug" or bat being then placed upon the upper face of section 2 and the operation repeated. In this manner the handles may be readily manufactured in great numbers at very small cost thus effecting a great saving over the present method employed for making cup handles.

What I claim is:—

1. In a method of making cup handles the forming of a plurality of cup handles integrally with a connecting member by pressing from a bat.

2. In a method of making cup handles, the forming by pressing from a bat of plastic material of a stick member and a plurality of cup handles integrally connected to said stick member at opposite sides thereof.

3. In a method of making cup handles, the forming by pressing from a bat of plastic material of a supporting member and a plurality of cup handles each integrally connected at both ends to said supporting member.

4. In the making of articles of pottery, a method including the pressing of a bat between upper and lower die sections to form a plurality of articles attached to a connecting member and then raising the connecting member above the lower die section so as to be readily grasped upon raising of the upper die section.

5. In a method of making articles of pottery, the pressing between die sections of a bat to form a plurality of articles and a connecting member to which said articles are attached.

6. In a die for making articles of pottery, an upper section provided in its lower face with a central groove and supplemental grooves communicating with said central groove, and a lower section provided in its upper face with a central groove and communicating supplemental grooves corresponding to the grooves of said upper section, each of the supplemental grooves of said sections being provided at its juncture with the central groove with a raised element to produce a restricted opening between the supplemental groove and the central groove.

7. In a die for making articles of pottery, an upper section provided in its lower face with a central groove and supplemental grooves communicating with said central groove, a lower section provided in its upper face with a relatively deep central groove and with communicating supplemental grooves corresponding to the supplemental grooves of the upper section, a plunger head fitting snugly in the central groove of the lower section and vertically slidable therein, means for normally holding said head raised, and means for depressing the head as the upper section is lowered into operative relation to the lower section.

8. In a die for making cup handles, an upper section provided in its lower face with a central groove and with lateral handle forming grooves communicating with said central groove, and a lower section provided in its upper face with a central groove and lateral communicating grooves corresponding to the grooves of said upper section.

9. In a die for making cup handles, an upper section provided in its lower face with a central groove and lateral grooves communicating with said central groove, a fixed lower section provided in its upper face with a relatively deep central groove and lateral grooves corresponding to the lateral grooves of the upper section and communicating with said central groove, a head fitting snugly in the central groove of the lower section and slidable vertically therein, a plate positioned beneath the lower section, the plate and the head being connected for similar vertical movement, means for normally holding said plate raised, and means for depressing said plate when said upper section is lowered into operative relation to said lower section.

In testimony whereof I affix my signature.

JAMES BENTON.